(12) United States Patent (10) Patent No.: US 11,670,187 B2
Nakanishi et al. (45) Date of Patent: Jun. 6, 2023

(54) INFORMATION PROCESSING DEVICE, INFORMATION PROCESSING SYSTEM, PROGRAM, AND VEHICLE

(71) Applicant: TOYOTA JIDOSHA KABUSHIKI KAISHA, Toyota (JP)

(72) Inventors: Tooru Nakanishi, Nagakute (JP); Tadashi Yamada, Toyota (JP); Josuke Yamane, Nissin (JP); Mitsuhiro Miura, Toyota (JP); Tomo Sasaki, Toyota (JP); Tomoyuki Kozuka, Toyota (JP); Tae Sugimura, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 162 days.

(21) Appl. No.: 17/230,449

(22) Filed: Apr. 14, 2021

(65) Prior Publication Data

US 2021/0398442 A1 Dec. 23, 2021

(30) Foreign Application Priority Data

Jun. 19, 2020 (JP) .............................. JP2020-106308

(51) Int. Cl.
  *G09B 9/052* (2006.01)
  *B60W 40/08* (2012.01)
  *B60W 50/14* (2020.01)
  *H04W 4/46* (2018.01)
  *B60W 30/02* (2012.01)

(52) U.S. Cl.
  CPC ............. *G09B 9/052* (2013.01); *B60W 30/02* (2013.01); *B60W 40/08* (2013.01); *B60W 50/14* (2013.01); *H04W 4/46* (2018.02); *B60W 2040/0809* (2013.01); *B60W 2050/146* (2013.01); *B60W 2552/35* (2020.02)

(58) Field of Classification Search
  CPC ........ G09B 9/052; H04W 4/46; B60W 30/02; B60W 40/08; B60W 50/14; B60W 2552/35; B60W 2040/0809; B60W 250/146
  See application file for complete search history.

(56) References Cited

U.S. PATENT DOCUMENTS

| 2015/0298550 | A1 | 10/2015 | Okada | |
| 2019/0276036 | A1* | 9/2019 | Noguchi | B60W 30/18 |
| 2020/0164844 | A1* | 5/2020 | Jung | B60W 40/068 |
| 2020/0242383 | A1* | 7/2020 | el Kaliouby | B60W 50/14 |
| 2020/0310546 | A1* | 10/2020 | Tsunoda | G06F 3/0304 |
| 2022/0063675 | A1* | 3/2022 | Mimura | B60Q 1/50 |

(Continued)

FOREIGN PATENT DOCUMENTS

| JP | 2005-316604 A | 11/2005 |
| JP | 2008108247 A * | 5/2008 |

(Continued)

*Primary Examiner* — Behrang Badii
*Assistant Examiner* — Jay Khandpur
(74) *Attorney, Agent, or Firm* — Oblon, McClelland, Maier & Neustadt, L.L.P.

(57) ABSTRACT

An information processing device includes a control unit. The control unit acquires actual traveling information about a first vehicle that travels along a first traveling route, and generates control information for reproducing a traveling state of the first vehicle on the first traveling route, based on the acquired traveling information about the first vehicle.

20 Claims, 8 Drawing Sheets

(56) References Cited

U.S. PATENT DOCUMENTS

2022/0305375 A1\* 9/2022 Morita ............... A63F 13/218
2022/0350406 A1\* 11/2022 Ohnishi ............... G06F 3/016

FOREIGN PATENT DOCUMENTS

| JP | 2010-089698 A | 4/2010 |
| JP | 2014-106717 A | 6/2014 |
| JP | 2017-157093 A | 9/2017 |
| WO | WO-2019155557 A1 \* | 8/2019 |

\* cited by examiner

FIG. 3

| FIRST VEHICLE | FIRST TRAVELING ROUTE | TRAVELING INFORMATION | CONTROL INFORMATION |
|---|---|---|---|
| C1 | GENERAL ROAD | ESTIMATED ROAD SURFACE ROUGHNESS | INFORMATION A |
| C2 | GENERAL ROAD | ESTIMATED ROAD SURFACE FRICTION COEFFICIENT | INFORMATION B |
| C3 | CIRCUIT FIELD | ACCELERATION | INFORMATION C |
| C4 | CIRCUIT FIELD | ANGULAR VELOCITY | INFORMATION D |
| ... | ... | ... | ... |

INFORMATION PROCESSING DEVICE, INFORMATION PROCESSING SYSTEM, PROGRAM, AND VEHICLE

CROSS-REFERENCE TO RELATED APPLICATION

This application claims priority to Japanese Patent Application No. 2020-106308 filed on Jun. 19, 2020, incorporated herein by reference in its entirety.

BACKGROUND

1. Technical Field

The present disclosure relates to an information processing device, an information processing system, a program, and a vehicle.

2. Description of Related Art

Conventionally, there has been known a technology for controlling display information that should be visually recognized by a driver of a real vehicle. For example, Japanese Unexamined Patent Application Publication No. 2017-157093 discloses a vehicle display device that facilitates an intuitive perceiving of a position corresponding to the display information by reducing the gap between the display position of the display information that should be visually recognized by the driver of the real vehicle and a position in a three-dimensional space that is perceived by the driver.

SUMMARY

Thus, the technology relevant to the control of the display information that should be visually recognized by the driver has been established to some content. However, there has not been sufficiently considered a technology that allows a realistic experience of a traveling state of a predetermined vehicle by reproducing the traveling state of the predetermined vehicle using an arbitrary medium including a vehicle.

In view of such a circumstance, an object of the present disclosure is to allow a realistic experience of a traveling state of a predetermined vehicle.

An information processing device according to an embodiment of the present disclosure includes a control unit configured to acquire actual traveling information about a first vehicle that travels along a first traveling route, and to generate control information based on the acquired traveling information about the first vehicle, the control information being information for reproducing a traveling state of the first vehicle on the first traveling route.

A program according to an embodiment of the present disclosure causes an information processing device to execute an operation including: acquiring actual traveling information about a first vehicle that travels along a first traveling route; and generating control information based on the acquired traveling information about the first vehicle, the control information being information for reproducing a traveling state of the first vehicle on the first traveling route.

A vehicle according to an embodiment of the present disclosure includes a control unit configured to acquire actual traveling information about another vehicle that travels along a first traveling route, and to generate control information based on the acquired traveling information about the other vehicle, the control information being information for reproducing a traveling state of the other vehicle on the first traveling route.

An information processing device, an information processing system, a program and a vehicle according to an embodiment of the present disclosure allow a realistic experience of a traveling state of a predetermined vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram for describing an exemplary process by a control unit of the information processing device in FIG. 2;

DETAILED DESCRIPTION OF EMBODIMENTS

Embodiments of the present disclosure will be described below with reference to the drawings.

First Embodiment

Figure 1:
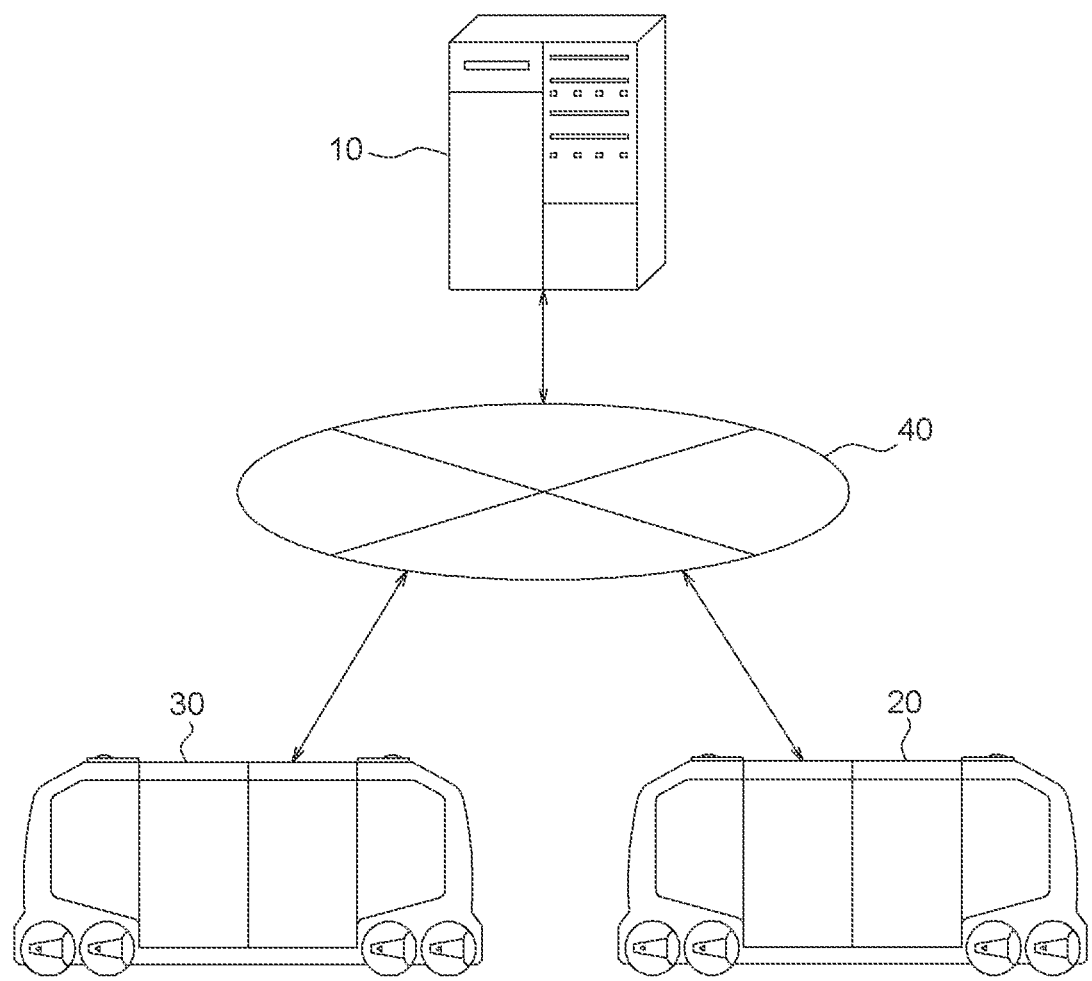
FIG. 1 is a configuration diagram illustrating a configuration of an information processing system that includes an information processing device according to a first embodiment of the present disclosure.

FIG. 1 is a configuration diagram illustrating a configuration of an information processing system 1 that includes an information processing device 10 according to a first embodiment of the present disclosure. An outline of the information processing system 1 that includes an information processing device 10 according to the first embodiment of the present disclosure will be mainly described with reference to FIG. 1. The information processing system 1 includes a first vehicle 20 and a second vehicle 30, in addition to the information processing device 10.

In FIG. 1, for simplification of description, one information processing device 10, one first vehicle 20 and one second vehicle 30 are illustrated. However, in the information processing system 1, each of the number of information processing devices 10, the number of first vehicles 20 and the number of the second vehicles 30 may be two or more. For example, an occupant may continuously use an identical first vehicle 20, or may use an arbitrary different first vehicle

20 of a plurality of first vehicles 20 at each riding or at a predetermined interval. For example, an occupant may continuously use an identical second vehicle 30, or may use an arbitrary different second vehicle 30 of a plurality of second vehicles 30 at each riding or at a predetermined interval.

The number of occupants of the first vehicle 20 may be one, or may be two or more. Without being limited to them, the number of occupants of the first vehicle 20 may be zero. The number of occupants of the second vehicle 30 may be one, or may be two or more. Each of the information processing device 10, the first vehicle 20 and the second vehicle 30 is communicably connected to a network 40 that includes a mobile communication network and the internet, for example.

The information processing device 10 is one server device or a plurality of server devices that can communicate with each other. Without being limited to them, the information processing device 10 may be an arbitrary general-purpose electronic device such as a PC (Personal Computer) or a smartphone, or may be another electronic device dedicated for the information processing system 1.

For example, the first vehicle 20 is an automobile. Without being limited to this, the first vehicle 20 may be an arbitrary vehicle that allows traveling while a human is in the first vehicle 20 or while no human is in the first vehicle 20. For example, the first vehicle 20 is a vehicle that performs automatic driving. The automatic driving includes levels 1 to 5 defined by SAE (Society of Automotive Engineers), for example, but without being limited to them, may be arbitrarily defined. The first vehicle 20 is not limited to the vehicle that performs automatic driving, and may be an arbitrary vehicle that is driven by a driver.

For example, the second vehicle 30 is an automobile. Without being limited to this, the second vehicle 30 may be an arbitrary vehicle that allows traveling while a human is in the second vehicle 30. For example, the second vehicle 30 is a vehicle that performs automatic driving. The automatic driving includes the levels 1 to 5 defined by SAE, for example, but without being limited to them, may be arbitrarily defined. The second vehicle 30 is not limited to the vehicle that performs automatic driving, and may be an arbitrary vehicle that is driven by a driver.

As an outline of the first embodiment, the information processing device 10 acquires actual traveling information about the first vehicle 20 that travels along a first traveling route. In the present specification, for example, the "traveling information" includes arbitrary information that is acquired by the first vehicle 20 when the first vehicle 20 travels along a first traveling route and that is obtained in connection with the traveling of the first vehicle 20. For example, the "first traveling route" may include a traveling route to a destination that is previously selected by the occupant of the first vehicle 20, or may include an arbitrary traveling route along which the first vehicle 20 appropriately travels without a previous decision of the traveling route.

For example, the "traveling information" includes road surface information, curve information and the like about the first traveling route along which the first vehicle 20 travels. In the present specification, for example, the "road surface information" includes a road surface friction coefficient G0, a road surface roughness, a road surface gradient and the like that are estimated by a brake ECU (Electronic Control Unit) of the first vehicle 20. In the present specification, for example, the "curve information" includes the number of curves, curvature radii and the like. In addition, for example, the "traveling information" includes the velocity, front-rear directional acceleration, right-left directional acceleration, angular velocity, shift lever operation and steering angle of the first vehicle 20, a traveling image that is obtained by picking up an exterior of the first vehicle 20 using an in-vehicle camera, and the like.

The information processing device 10 generates control information for reproducing a traveling state of the first vehicle 20 on the first traveling route, based on the acquired traveling information about the first vehicle 20. In the first embodiment, for example, the "control information" includes information for controlling a traveling state of the second vehicle 30 that travels along a second traveling route different from the first traveling route. For example, the "control information" includes driving information such as the velocity, front-rear directional acceleration, right-left directional acceleration, angular velocity, shift lever operation and steering operation of the second vehicle 30 in an automatic driving state. For example, the "control information" includes information about a vibration pattern that is given to a seat in a vehicle cabin of the second vehicle 30 in the automatic driving state. The information processing device 10 provides the control information to the second vehicle 30.

In the first embodiment, for example, the "second traveling route" may include a traveling route to a destination that is previously selected by the occupant of the second vehicle 30, or may include an arbitrary traveling route along which the second vehicle 30 appropriately travels without a previous decision of the traveling route by the occupant. For example, the "second vehicle 30 that travels along the second traveling route" includes at least one of a general vehicle that travels along a traveling route on a general road and a driving-school vehicle that travels along a traveling route in a driving school.

Figure 2:
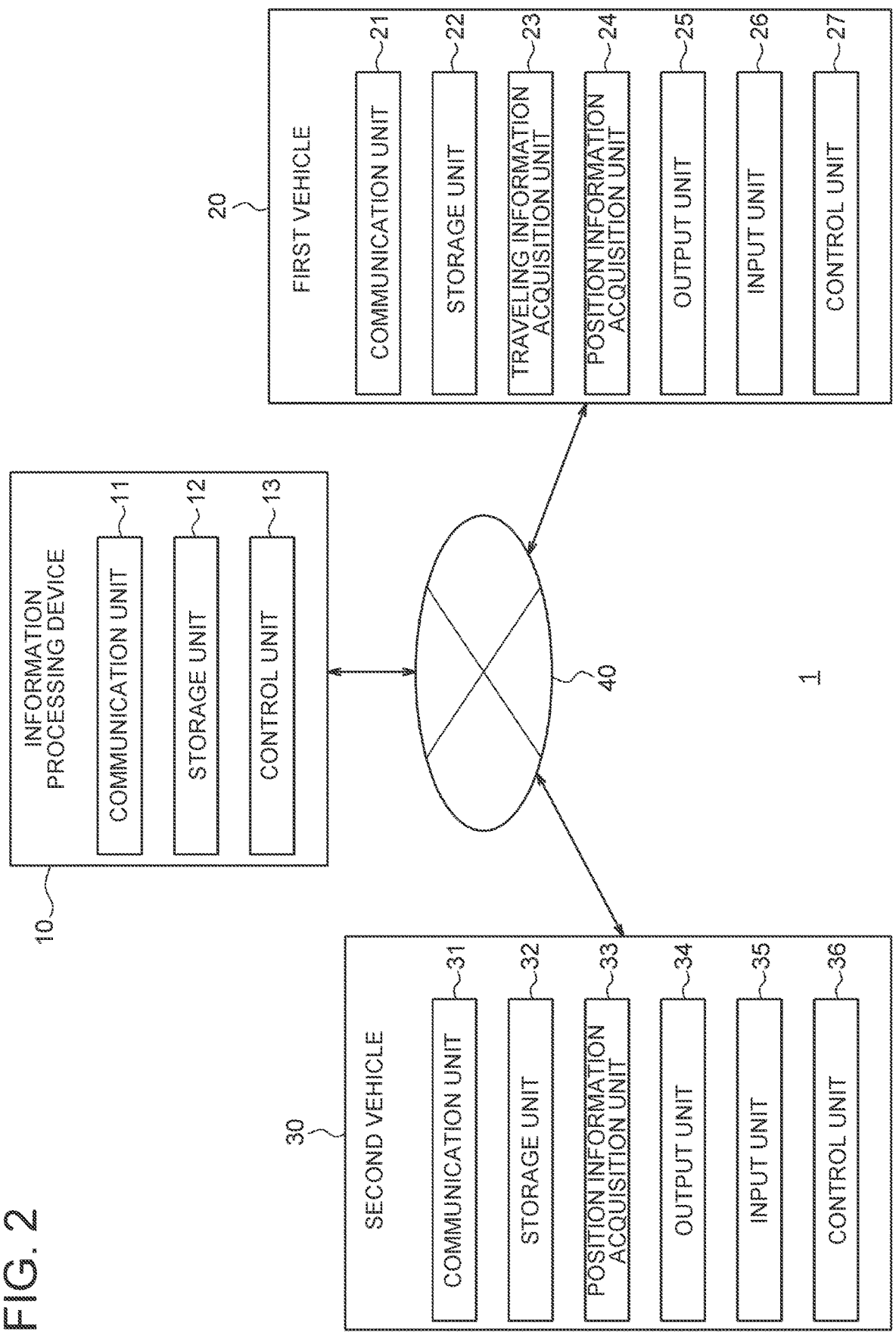
FIG. 2 is a functional block diagrams illustrating schematic configurations of the information processing device, a first vehicle and a second vehicle in FIG. 1.

Next, configurations of the information processing device 10, the first vehicle 20 and the second vehicle 30 that are included in the information processing system 1 will be mainly described with reference to FIG. 2. FIG. 2 is a functional block diagram illustrating schematic configurations of the information processing device 10, the first vehicle 20 and the second vehicle 30 in FIG. 1.

As illustrated in FIG. 2, the first vehicle 20 includes a communication unit 21, a storage unit 22, a traveling information acquisition unit 23, a position information acquisition unit 24, an output unit 25, an input unit 26, and a control unit 27. The communication unit 21, the storage unit 22, the traveling information acquisition unit 23, the position information acquisition unit 24, the output unit 25, the input unit 26 and the control unit 27 are communicably connected to each other, for example, through an in-vehicle network such as a CAN (Controller Area Network), or through a dedicated line.

The communication unit 21 includes a communication module that performs connection to the network 40. For example, the communication unit 21 may include a communication module that supports a mobile communication standard such as 4G (4th Generation) and 5G (5th Generation). The first vehicle 20 is connected to the network 40 through the communication unit 21. The communication unit 21 sends and receives a variety of information through the network 40.

The storage unit 22 is a semiconductor memory, a magnetic memory or an optical memory, for example, but is not limited to them. For example, the storage unit 22 may function as a main storage device, an auxiliary storage device or a cache memory. The storage unit 22 stores arbitrary information that is used for the operation of the first vehicle 20. For example, the storage unit 22 stores the traveling information acquired by the traveling information acquisition unit 23. In addition, for example, the storage unit 22 may store a system program, an application program, a variety of information received by the communication unit 21, and the like. For example, the information stored in the storage unit 22 may be updated to information that is received from the network 40 through the communication unit 21.

The traveling information acquisition unit 23 includes an arbitrary module that can acquire a variety of traveling information. For example, the traveling information acquisition unit 23 includes a sensor module that can acquire the variety of the aforementioned traveling information. For example, the traveling information acquisition unit 23 includes a brake ECU that can acquire the road surface information including the road surface friction coefficient, the road surface roughness, the road surface gradient and the like. In addition, for example, the traveling information acquisition unit 23 may include a velocity sensor, a front-rear directional acceleration sensor, a right-left directional acceleration sensor, an angular velocity sensor, a shift lever position sensor, a steering angle sensor, and a camera module that is installed on the outside of the vehicle cabin of the first vehicle 20, that is connected to the CAN and that can pick up the exterior of the first vehicle 20.

The position information acquisition unit 24 includes one or more receivers that correspond to an arbitrary satellite positioning system. For example, the position information acquisition unit 24 may include a GPS (Global Positioning System) receiver. The position information acquisition unit 24 acquires a measured value of the position of the first vehicle 20 as position information. In the present specification, for example, the "position information" includes address, latitude, longitude, altitude and the like. The position information acquisition unit 24 may acquire the position information about the first vehicle 20 constantly, or may acquire the position information about the first vehicle 20 periodically or randomly.

For example, the output unit 25 outputs information received by the communication unit 21, and the like, to the occupant in the vehicle cabin of the first vehicle 20. For example, the output unit 25 includes a car navigation device. For example, the output unit 25 includes an output device such as a liquid crystal display that constitutes the car navigation device. For example, the car navigation device that constitutes the output unit 25 outputs information through at least one of an image and a voice.

Without being limited to this, the output unit 25 may include an arbitrary output device that gives an influence on at least one of the visual sense and auditory sense of the occupant of the first vehicle 20. For example, the output unit 25 may include another arbitrary voice output device that is other than the car navigation device and that gives an influence mainly on the auditory sense of the occupant of the first vehicle 20. For example, the output unit 25 may include another arbitrary image output device that is other than the car navigation device and that gives an influence mainly on the visual sense of the occupant of the first vehicle 20.

For example, the input unit 26 includes one or more input interfaces that accept an occupant's input operation to the information output by the output unit 25 and that acquire input information based on the occupant's input operation. For example, the input unit 26 includes the car navigation device that constitutes the output unit 25. For example, the input unit 26 includes a touch screen provided integrally with the liquid crystal display that constitutes the car navigation device. For example, the car navigation device that constitutes the input unit 26 accepts the occupant's input operation based on an occupant's touch operation.

Without being limited to this, the input unit 26 may include an arbitrary input interface that can acquire the input information based on the occupant's input operation by detecting the occupant's input operation. For example, the input unit 26 may include a physical key, a capacitance key, a microphone that accepts a voice input, and the like.

The control unit 27 includes one or more processors. The "processor" is a general-purpose processor, or a processor dedicated for a particular process, but is not limited to them. For example, the control unit 27 may include an ECU. The control unit 27 is communicably connected to constituent units that constitute the first vehicle 20, and controls the whole operation of the first vehicle 20.

Using the traveling information acquisition unit 23, the control unit 27 acquires the traveling information when the first vehicle 20 actually travels along the first traveling route. The control unit 27 sends the traveling information acquired by the traveling information acquisition unit 23, to the information processing device 10, through the communication unit 21 and the network 40. Using the position information acquisition unit 24, the control unit 27 acquires the position information about the first vehicle 20. The control unit 27 may send the position information about the first vehicle 20 acquired by the position information acquisition unit 24, to the information processing device 10, through the communication unit 21 and the network 40.

Next, the configuration of the second vehicle 30 included in the information processing system 1 will be mainly described. As illustrated in FIG. 2, the second vehicle 30 includes a communication unit 31, a storage unit 32, a position information acquisition unit 33, an output unit 34, an input unit 35, and a control unit 36. The communication unit 31, the storage unit 32, the position information acquisition unit 33, the output unit 34, the input unit 35 and the control unit 36 are communicably connected to each other, for example, through an in-vehicle network such as a CAN, or through a dedicated line.

The communication unit 31 includes a communication module that performs connection to the network 40. For example, the communication unit 31 may include a communication module that supports a mobile communication standard such as 4G and 5G. In the first embodiment, the second vehicle 30 is connected to the network 40 through the communication unit 31. The communication unit 31 sends and receives a variety of information through the network 40.

The storage unit 32 is a semiconductor memory, a magnetic memory or an optical memory, for example, but is not limited to them. For example, the storage unit 32 may function as a main storage device, an auxiliary storage device or a cache memory. The storage unit 32 stores arbitrary information that is used for the operation of the second vehicle 30. For example, the storage unit 32 stores control information that is generated and provided by the information processing device 10. In addition, for example, the storage unit 32 may store a system program, an application program, a variety of information received by the communication unit 31, and the like. For example, the information stored in the storage unit 32 may be updated to information that is received from the network 40 through the communication unit 31.

The position information acquisition unit 33 includes one or more receivers that correspond to an arbitrary satellite positioning system. For example, the position information acquisition unit 33 may include a GPS receiver. The position information acquisition unit 33 acquires a measured value of the position of the second vehicle 30 as position information. The position information acquisition unit 33 may acquire the position information about the second vehicle 30 constantly, or may acquire the position information about the second vehicle 30 periodically or randomly.

For example, the output unit 34 outputs information received by the communication unit 31, and the like, to the occupant in the vehicle cabin of the second vehicle 30. For example, the output unit 34 includes a car navigation device. For example, the output unit 34 includes an output device such as a liquid crystal display that constitutes the car navigation device. For example, the car navigation device that constitutes the output unit 34 outputs information through at least one of an image and a voice.

Without being limited to this, the output unit 34 may include an arbitrary output device that gives an influence on at least one of the visual sense and auditory sense of the occupant of the second vehicle 30. For example, the output unit 34 may include another arbitrary voice output device that is other than the car navigation device and that gives an influence mainly on the auditory sense of the occupant of the second vehicle 30. For example, the output unit 34 may include another arbitrary image output device that is other than the car navigation device and that gives an influence mainly on the visual sense of the occupant of the second vehicle 30.

For example, the input unit 35 includes one or more input interfaces that accept an occupant's input operation to the information output by the output unit 34 and that acquire input information based on the occupant's input operation. For example, the input unit 35 includes the car navigation device that constitutes the output unit 34. For example, the input unit 35 includes a touch screen provided integrally with the liquid crystal display that constitutes the car navigation device. For example, the car navigation device that constitutes the input unit 35 accepts the occupant's input operation based on an occupant's touch operation.

Without being limited to this, the input unit 35 may include an arbitrary input interface that can acquire the input information based on the occupant's input operation by detecting the occupant's input operation. For example, the input unit 35 may include a physical key, a capacitance key, a microphone that accepts a voice input, and the like.

The control unit 36 includes one or more processors. The "processor" is a general-purpose processor, or a processor dedicated for a particular process, but is not limited to them. For example, the control unit 36 may include an ECU. The control unit 36 is communicably connected to constituent units that constitute the second vehicle 30, and controls the whole operation of the second vehicle 30.

The control unit 36 receives the control information generated by the information processing device 10, from the information processing device 10, through the network 40 and the communication unit 31. The control unit 36 controls the traveling state of the second vehicle 30 that travels along the second traveling route, based on the acquired control information.

For example, the control unit 36 receives course information about a destination, which is information decided by the information processing device 10 or another arbitrary external device, through the network 40 and the communication unit 31. For example, the control unit 36 executes a vehicle control for the second vehicle 30, based on the received course information about the destination. In the present specification, for example, the "vehicle control" includes the automatic driving to the destination, but is not limited to this. For example, the control unit 36 may merely assist the driving of the second vehicle 30 by the driver, by displaying the received course information about the destination on the output unit 34.

The control unit 36 acquires the position information about the second vehicle 30, using the position information acquisition unit 33. The control unit 36 may send the position information about the second vehicle 30 acquired by the position information acquisition unit 33, to the information processing device 10, through the communication unit 31 and the network 40.

Next, the configuration of the information processing device 10 included in the information processing system 1 will be mainly described. As illustrated in FIG. 2, the information processing device 10 includes a communication unit 11, a storage unit 12 and a control unit 13.

The communication unit 11 includes a communication module that performs connection to the network 40. For example, the communication unit 11 may include a communication module that supports a mobile communication standard such as 4G and 5G, or an internet standard. The information processing device 10 is connected to the network 40 through the communication unit 11. The communication unit 11 sends and receives a variety of information through the network 40.

The storage unit 12 is a semiconductor memory, a magnetic memory or an optical memory, for example, but is not limited to them. For example, the storage unit 12 may function as a main storage device, an auxiliary storage device or a cache memory. The storage unit 12 stores arbitrary information that is used for the operation of the information processing device 10. For example, the storage unit 12 may store a system program, an application program, a variety of information received by the communication unit 11, and the like. For example, the information stored in the storage unit 12 may be updated to information that is received from the network 40 through the communication unit 11.

The control unit 13 includes one or more processors. The "processor" is a general-purpose processor, or a processor dedicated for a particular process, but is not limited to them. The control unit 13 is communicably connected to constituent units that constitute the information processing device 10, and controls the whole operation of the information processing device 10.

The control unit 13 may receive the position information about the first vehicle 20 acquired by the position information acquisition unit 24 of the first vehicle 20, from the first vehicle 20, through the network 40 and the communication unit 11. The control unit 13 may acquire route information about the first traveling route along which the first vehicle 20 travels, based on the position information about the first vehicle 20, or may directly acquire the route information about the first traveling route selected by the occupant of the first vehicle 20, for example, using the output unit 25 and the input unit 26. Without being limited to them, it is allowable that the control unit 13 does not acquire the route information about the first traveling route along which the first vehicle 20 travels.

The control unit 13 may receive the position information about the second vehicle 30 acquired by the position information acquisition unit 33 of the second vehicle 30, from the second vehicle 30, through the network 40 and the communication unit 11. The control unit 13 may acquire route information about the second traveling route along which the second vehicle 30 travels, based on the position information about the second vehicle 30, or may directly acquire the route information about the second traveling route selected by the occupant of the second vehicle 30, for example, using the output unit 34 and the input unit 35. Without being limited to them, it is allowable that the control unit 13 does not acquire the route information about the second traveling route along which the second vehicle 30 travels.

The control unit 13 acquires the actual traveling information about the first vehicle 20 that travels along the first traveling route. For example, the control unit 13 receives the traveling information acquired by the traveling information acquisition unit 23 of the first vehicle 20, from the first vehicle 20, through the network 40 and the communication unit 11. The control unit 13 generates the control information for reproducing the traveling state of the first vehicle 20 on the first traveling route, based on the acquired traveling state about the first vehicle 20.

The control unit 13 provides the generated control information to the second vehicle 30. For example, the control unit 13 sends the generated control information to the second vehicle 30 through the communication unit 11 and the network 40.

FIG. 3 is a diagram for describing an exemplary process by the control unit 13 of the information processing device 10 in FIG. 2. The exemplary process by the control unit 13 will be more specifically described with reference to FIG. 3.

In the exemplary process by the control unit 13, the control information for reproducing the traveling state of the first vehicle 20 is generated based on the traveling information acquired by the control unit 13. In FIG. 3, four first vehicles C1, C2, C3, C4 are shown, but the number of first vehicles 20 corresponding to a plurality of pieces of control information that is generated by the control unit 13 is not limited to four.

The control unit 13 acquires information of "general road", as the route information about the first traveling route along which the first vehicle C1 travels. At this time, the control unit 13 acquires the road surface information about the first traveling route, for example, information about the road surface roughness estimated by the brake ECU of the first vehicle C1, as the actual traveling information about the first vehicle C1 that travels along the first traveling route. The control unit 13 generates control information A for reproducing the traveling state of the first vehicle C1 on the first traveling route, based on the acquired information about the road surface roughness.

For example, the control information A includes the information about the vibration pattern that is given to the seat in the vehicle cabin of the second vehicle 30 in the automatic driving state, as the information for controlling the traveling state of the second vehicle 30 that travels along the second traveling route different from the first traveling route. The control unit 36 of the second vehicle 30 gives vibration to the seat in the vehicle cabin of the second vehicle 30, based on the control information A acquired from the information processing device 10. Thereby, when the second vehicle 30 travels along the second traveling route in the automatic driving state, the control unit 36 reproduces a traveling state of traveling on a rough road surface in the first traveling route.

The control unit 13 acquires information of "general road", as the route information about the first traveling route along which the first vehicle C2 travels. At this time, the control unit 13 acquires the road surface information about the first traveling route, for example, information about the road surface friction coefficient estimated by the brake ECU of the first vehicle C2, as the actual traveling information about the first vehicle C2 that travels along the first traveling route. The control unit 13 generates control information B for reproducing the traveling state of the first vehicle C2 on the first traveling route, based on the acquired information about the road surface friction coefficient.

For example, the control information B includes information about the velocity, front-rear directional acceleration, right-left directional acceleration and angular velocity of the second vehicle 30 in the automatic driving state, as the information for controlling the traveling state of the second vehicle 30 that travels along the second traveling route different from the first traveling route. The control unit 36 of the second vehicle 30 controls the velocity, front-rear directional acceleration, right-left directional acceleration and angular velocity of the second vehicle 30, based on the control information B acquired from the information processing device 10. Thereby, when the second vehicle 30 travels along the second traveling route in the automatic driving state, the control unit 36 reproduces a traveling state of traveling on a grippy or slippery road surface in the first traveling route.

The control unit 13 acquires information of "circuit field", as the route information about the first traveling route along which the first vehicle C3 travels. At this time, the control unit 13 acquires information about the front-rear directional acceleration and right-left directional acceleration of the first vehicle C3, as the actual traveling information about the first vehicle C3 that travels along the first traveling route in a circuit filed. The control unit 13 generates control information C for reproducing the traveling state of the first vehicle C3 on the first traveling route, based on the acquired information about the acceleration.

For example, the control information C includes the information about the front-rear directional acceleration and right-left directional acceleration of the second vehicle 30 in the automatic driving state, as the information for controlling the traveling state of the second vehicle 30 that travels along the second traveling route different from the first traveling route. The control unit 36 of the second vehicle 30 controls the front-rear directional acceleration and right-left directional acceleration of the second vehicle 30, based on the control information C acquired from the information processing device 10. Thereby, when the second vehicle 30 travels along the second traveling route in the automatic driving state, the control unit 36 reproduces the acceleration of the first vehicle C3 on the first traveling route.

The control unit 13 acquires information of "circuit field", as the route information about the first traveling route along which the first vehicle C4 travels. At this time, the control unit 13 acquires information about the angular velocity of the first vehicle C4, as the actual traveling information about the first vehicle C4 that travels along the first traveling route in a circuit filed. The control unit 13 generates control information D for reproducing the traveling state of the first vehicle C4 on the first traveling route, based on the acquired information about the angular velocity.

For example, the control information D includes the information about the angular velocity of the second vehicle 30 in the automatic driving state, as the information for controlling the traveling state of the second vehicle 30 that travels along the second traveling route different from the first traveling route. The control unit 36 of the second vehicle 30 controls the angular velocity of the second vehicle 30, based on the control information D acquired from the information processing device 10. Thereby, when the second vehicle 30 travels along the second traveling route in the automatic driving state, the control unit 36 reproduces the angular velocity of the first vehicle C4 on the first traveling route.

For example, the control unit 13 may acquire the road surface information about the second traveling route along which the second vehicle 30 travels, based on the acquired position information about the second vehicle 30. At this time, for example, the control unit 13 may access, through the network 40, an arbitrary database in which the route information and road surface information about the second traveling route are associated. The control unit 13 may generate the control information in association with the road surface information about the second traveling route acquired in this way. For example, the control unit 13 may generate the control information that matches the condition of a road surface on which the second vehicle 30 actually travels, based on the road surface information about the second traveling route.

For example, the control unit 13 may generate the information about the vibration pattern that is given to the seat in the vehicle cabin of the second vehicle 30 in the automatic driving state, so as to further emphasize a roughness feeling for a road surface that the occupant physically experiences when the second vehicle 30 travels on a rough road surface. For example, the control unit 13 may generate information about vibrational absorption for restraining the vibration of the second vehicle 30 in the automatic driving state, so as to restrain the roughness feeling for the road surface that the occupant physically experiences when the second vehicle 30 travels on the rough road surface.

For example, the control unit 13 may generate the information about the vibration pattern that is given to the seat in the vehicle cabin of the second vehicle 30 in the automatic driving state, such that the occupant can physically experience the roughness feeling for the road surface even when the second vehicle 30 travels on a nearly flat road surface. For example, the control unit 13 may generate the information about the vibrational absorption for restraining the vibration of the second vehicle 30 in the automatic driving state, so as to further restrain the roughness feeling for the road surface that the occupant physically experiences when the second vehicle 30 travels on the nearly flat road surface.

For example, the control unit 13 may generate the information about the velocity, front-rear directional acceleration, right-left directional acceleration and angular velocity of the second vehicle 30 in the automatic driving state, such that the occupant can physically experience a slip feeling even when the second vehicle 30 travels on a grippy road surface. For example, the control unit 13 may generate the information about the velocity, front-rear directional acceleration, right-left directional acceleration and angular velocity of the second vehicle 30 in the automatic driving state, so as to further restrain the slip feeling that the occupant physically experiences when the second vehicle 30 travels on the grippy road surface.

For example, the control unit 13 may generate the information about the velocity, front-rear directional acceleration, right-left directional acceleration and angular velocity of the second vehicle 30 in the automatic driving state, so as to further emphasize the slip feeling that the occupant physically experiences when the second vehicle 30 travels on a slippery road surface. For example, the control unit 13 may generate the information about the velocity, front-rear directional acceleration, right-left directional acceleration and angular velocity of the second vehicle 30 in the automatic driving state, so as to restrain the slip feeling that the occupant physically experiences when the second vehicle 30 travels on the slippery road surface.

For example, the control unit 13 may acquire, from the second vehicle 30, information about a moving image that is provided to the occupant in the vehicle cabin of the second vehicle 30 by the output unit 34. The control unit 13 may generate the control information in association with the information about the moving image acquired in this way. For example, the control unit 13 may generate the control information that matches a scene in the moving image that is provided to the occupant in the vehicle cabin of the second vehicle 30 by the output unit 34, based on the information about the moving image.

For example, the control unit 13 may generate the information about the vibration pattern that is given to the seat in the vehicle cabin of the second vehicle 30 in the automatic driving state, such that the information about the vibration pattern matches the scene in the moving image. For example, the control unit 13 may generate the information about the vibrational absorption for restraining the vibration of the second vehicle 30 in the automatic driving state, such that the information about the vibrational absorption matches the scene in the moving image. For example, the control unit 13 may generate the information about the velocity, front-rear directional acceleration, right-left directional acceleration and angular velocity of the second vehicle 30 in the automatic driving state, such that the information about the velocity, front-rear directional acceleration, right-left directional acceleration and angular velocity matches the scene in the moving image.

For example, the control unit 13 may acquire, from the first vehicle 20, the traveling image that is obtained by picking up the exterior of the first vehicle 20, as the actual traveling information about the first vehicle 20. Based on the traveling image acquired in this way, the control unit 13 may generate image information that is shown on a windshield of the second vehicle 30 while being superimposed on an actual landscape on the second traveling route. In the present specification, for example, the "image information" includes just a traveling image of the first vehicle 20 on the first traveling route. Without being limited to this, for example, the "image information" may include an image that is obtained by processing the traveling image of the first vehicle 20 on the first traveling route by an arbitrary method.

The control unit 13 may generate the control information in association with the generated image information. For example, the control unit 13 may generate the control information that matches the traveling image that is the traveling image of the first vehicle 20 on the first traveling route and that is shown on the windshield of the second vehicle 30 while being superimposed on the actual landscape on the second traveling route.

For example, the control unit 13 may generate the information about the vibration pattern that is given to the seat in the vehicle cabin of the second vehicle 30 in the automatic driving state, such that the information about the vibration pattern matches the traveling image of the first vehicle 20 on the first traveling route as a general road. For example, the control unit 13 may generate the information about the vibrational absorption for restraining the vibration of the second vehicle 30 in the automatic driving state, such that the information about the vibrational absorption matches the traveling image of the first vehicle 20 on the first traveling route as a general road. For example, the control unit 13 may generate the information about the velocity, front-rear directional acceleration, right-left directional acceleration and angular velocity of the second vehicle 30 in the automatic driving state, such that the information about the velocity, front-rear directional acceleration, right-left directional acceleration and angular velocity matches the traveling image of the first vehicle 20 on the first traveling route as a general road.

For example, the control unit 13 may generate the information about the front-rear directional acceleration, right-left directional acceleration and angular velocity of the second vehicle 30 in the automatic driving state, such that the information about the front-rear directional acceleration, right-left directional acceleration and angular velocity matches the traveling image of the first vehicle 20 on the first traveling route in a circuit field.

Figure 4:
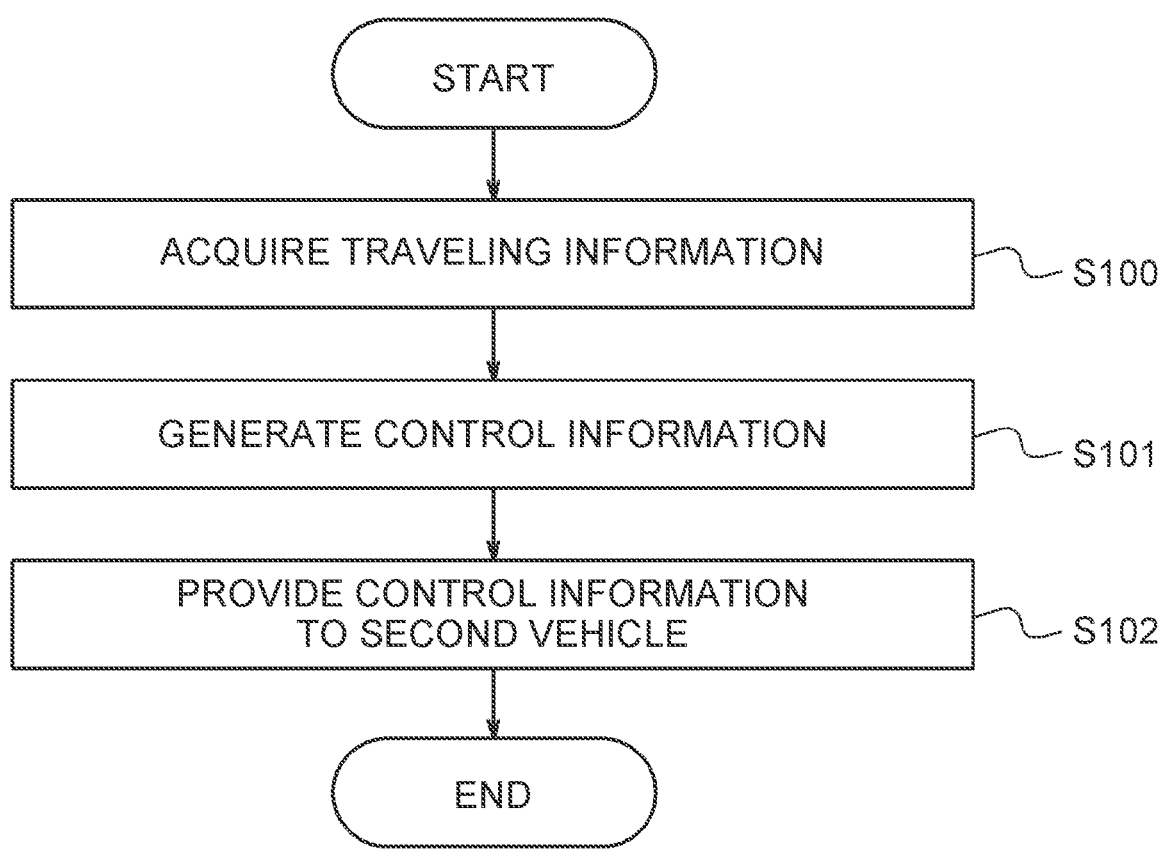
FIG. 4 is a flowchart for describing an exemplary information processing method that is executed by the information processing device in FIG. 1.

Next, an information processing method that is executed by the control unit 13 of the information processing device 10 according to the first embodiment will be described with reference to FIG. 4. FIG. 4 is a flowchart for describing an exemplary information processing method that is executed by the information processing device 10 in FIG. 1. In the exemplary information processing method, a basic flow of the process that is executed by the control unit 13 of the information processing device 10 according to the first embodiment will be described.

In step S100, the control unit 13 acquires the actual traveling information about the first vehicle 20 that travels along the first traveling route.

In step S101, the control unit 13 generates the control information for reproducing the traveling state of the first vehicle 20 on the first traveling route, based on the traveling information about the first vehicle 20 acquired in step S100.

In step S102, the control unit 13 provides the control information generated in step S101, to the second vehicle 30.

The first embodiment described above allows a realistic experience of the traveling state of the predetermined first vehicle 20. For example, the information processing device 10 can reproduce the traveling state of the first vehicle 20 on the first traveling route using an arbitrary medium including the second vehicle 30 and the like, by generating the control information based on the acquired traveling information. Thereby, a user that uses the arbitrary medium can virtually obtain a traveling feeling as if the user was traveling along the first traveling route.

For example, the user can virtually obtain a traveling feeling as if the user was traveling on a rough road surface in the first traveling route as a general road. For example, the user can virtually obtain a traveling feeling as if the user was traveling on a grippy or slippery road surface in the first traveling route as a general road. For example, the user can virtually obtain a traveling feeling as if the user was riding in the first vehicle 20 that was traveling along the first traveling route in a circuit field.

When the control information includes the information for controlling the traveling state of the second vehicle 30 that travels along the second traveling route different from the first traveling route, the information processing device 10 can reproduce the traveling state of the first vehicle 20 on the first traveling route, in the second vehicle 30 to which the control information is provided. Thereby, even on the second traveling route different from the first traveling route, the occupant of the second vehicle 30 can virtually obtain a traveling feeling as if the occupant was traveling along the first traveling route.

When the control unit 13 generates the control information in association with the road surface information about the second traveling route, the information processing device 10 can further emphasize or restrain a traveling feeling that is obtained by the occupant of the second vehicle 30 based on the road surface condition of the second traveling route. For example, the information processing device 10 can emphasize the roughness feeling for the road surface of the second traveling route that the occupant of the second vehicle 30 has, depending on the vibration pattern that is given to the seat in the vehicle cabin of the second vehicle 30 in the automatic driving state. For example, the information processing device 10 can emphasize or restrain the slip feeling for the road surface of the second traveling route that the occupant of the second vehicle 30 has, depending on the velocity, front-rear directional acceleration, right-left directional acceleration and angular velocity of the second vehicle 30 in the automatic driving state.

When the control unit 13 generates the control information in association with the acquired information about the moving image, the information processing device 10 can enhance a presence feeling for the moving image that is watched by the occupant of the second vehicle 30.

When the control unit 13 generates the control information in association with the image information that is shown on the windshield of the second vehicle 30, the information processing device 10 can provide, to the occupant of the second vehicle 30, a traveling feeling that matches the image that is shown on the windshield of the second vehicle 30 while being superimposed on the actual landscape on the second traveling route. Thereby, even on the second traveling route different from the first traveling route, the occupant of the second vehicle 30 can virtually obtain a traveling feeling as if the occupant was traveling along the first traveling route. For example, even on the second traveling route as a general road, the occupant of the second vehicle 30 can virtually obtain a traveling feeling as if the occupant was traveling along the first traveling route in a circuit field.

When the second vehicle 30 that travels along the second traveling route includes at least one of a general vehicle that travels along a traveling route on a general road and a driving-school vehicle that travels along a traveling route in a driving school, the information processing device 10 can reproduce the traveling state of the first vehicle 20 on the first traveling route, in at least one of the general vehicle and the driving-school vehicle to which the control information is provided. For example, even on the second traveling route constituted by a flat road surface in the driving school, the occupant of the driving-school vehicle to which the control information is provided can virtually obtain a traveling feeling as if the occupant was traveling along the first traveling route as a general road under a worse road surface condition. Thereby, a trainee in the driving school can learn a driving skill for a bad road surface condition of a general road, at the time of a driving lesson in the driving school, and can take a high-quality driving lesson.

Second Embodiment

Figure 5:
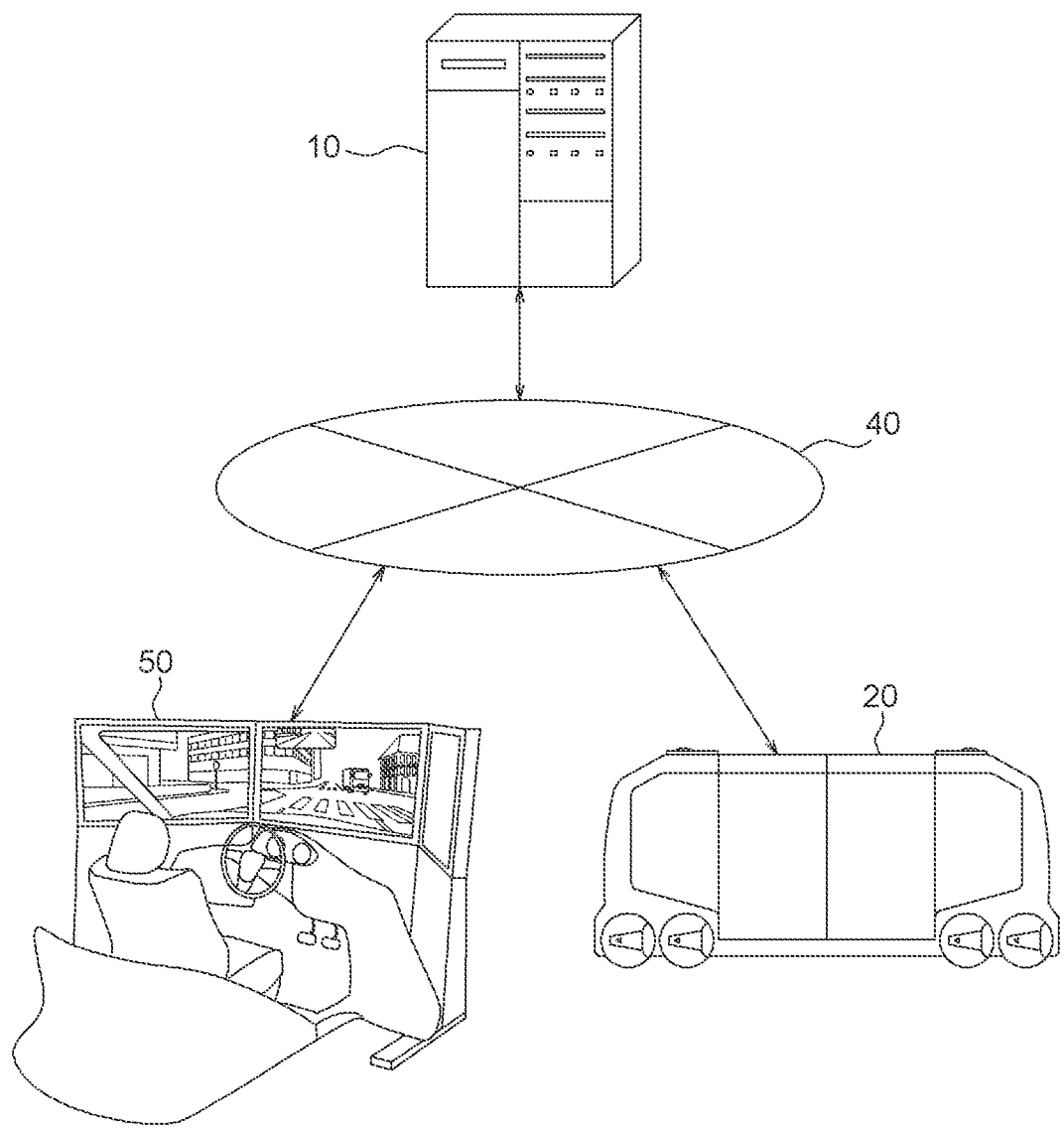
FIG. 5 is a configuration diagram illustrating a configuration of an information processing system that includes an information processing device according to a second embodiment of the present disclosure.

FIG. 5 is a configuration diagram illustrating a configuration of an information processing system 1 that includes an information processing device 10 according to a second embodiment of the present disclosure. An outline of the information processing system 1 that includes the information processing device 10 according to the second embodiment of the present disclosure will be mainly described with reference to FIG. 5.

The information processing system 1 according to the second embodiment is different from the information processing system 1 according to the first embodiment, in that a driving simulator 50 is included instead of the second vehicle 30. Other configurations, functions, effects, modifications and the like are the same as those in the first embodiment, and the corresponding descriptions can be applied to the information processing system 1 according to the second embodiment. In the following, the same constituent units as those in the first embodiment will be denoted by the same reference numerals, and descriptions of the constituent units will be omitted. Differences from the first embodiment will be mainly described.

In FIG. 5, for simplification of description, one information processing device 10, one first vehicle 20 and one driving simulator 50 are illustrated. However, in the information processing system 1, each of the number of information processing devices 10, the number of first vehicles 20 and the number of driving simulators 50 may be two or more. Each of the information processing device 10, the first vehicle 20 and the driving simulator 50 is communicably connected to the network 40.

For example, the driving simulator 50 is an arbitrary driving simulator that is installed in a driving school or the like. For example, the driving simulator 50 is used in order for a trainee attending the driving school to learn an automobile driving skill.

In the second embodiment, for example, the "control information" includes information for controlling the operation state of the driving simulator 50. For example, the "control information" includes operation information about a virtual velocity, front-rear directional acceleration, right-left directional acceleration, angular velocity, shift lever operation, steering operation and others that a user physically experiences in the driving simulator 50. For example, the "control information" includes information about a vibration pattern that is given to a seat in the driving simulator 50.

The control unit 13 of the information processing device 10 provides the generated control information to the driving simulator 50. For example, the control unit 13 sends the generated control information to the driving simulator 50 through the communication unit 11 and the network 40.

For example, the control information A in FIG. 3 includes the information about the vibration pattern that is given to the seat in the driving simulator 50, as the information for controlling the operation state of the driving simulator 50. The driving simulator 50 gives vibration to the seat in the driving simulator 50, based on the control information A acquired from the information processing device 10. Thereby, during operation, the driving simulator 50 reproduces a traveling state of traveling on a rough road surface in the first traveling route.

For example, the control information B in FIG. 3 includes information about the virtual velocity, front-rear directional acceleration, right-left directional acceleration and angular velocity that the user physically experiences in the driving simulator 50, as the information for controlling the operation state of the driving simulator 50. The driving simulator 50 controls the virtual velocity, front-rear directional acceleration, right-left directional acceleration and angular velocity, based on the control information B acquired from the information processing device 10. Thereby, during operation, the driving simulator 50 reproduces a traveling state of traveling on a grippy or slippery road surface in the first traveling route.

For example, the control information C in FIG. 3 includes information about the virtual front-rear directional acceleration and right-left directional acceleration that the user physically experiences in the driving simulator 50, as the information for controlling the operation state of the driving simulator 50. The driving simulator 50 controls the virtual front-rear directional acceleration and right-left directional acceleration, based on the control information C acquired from the information processing device 10. Thereby, during operation, the driving simulator 50 reproduces the acceleration of the first vehicle C3 on the first traveling route.

For example, the control information D in FIG. 3 includes information about the virtual angular velocity that the user physically experiences in the driving simulator 50, as the information for controlling the operation state of the driving simulator 50. The driving simulator 50 controls the virtual angular velocity, based on the control information D acquired from the information processing device 10. Thereby, during operation, the driving simulator 50 reproduces the angular velocity of the first vehicle C4 on the first traveling route.

For example, the control unit 13 may generate image information that is shown on a monitor of the driving simulator 50, based on the acquired traveling image of the first vehicle 20. The control unit 13 may generate the control information in association with the generated image information. For example, the control unit 13 may generate the control information that matches the traveling image that is the traveling image of the first vehicle 20 on the first traveling route and that is shown on the monitor of the driving simulator 50.

For example, the control unit 13 may generate the information about the vibration pattern that is given to the seat in the driving simulator 50, such that the information about the vibration pattern matches the traveling image of the first vehicle 20 on the first traveling route as a general road. For example, the control unit 13 may generate the information about the virtual velocity, front-rear directional acceleration, right-left directional acceleration and angular velocity that the user physically experiences in the driving simulator 50, such that the information about the virtual velocity, front-rear directional acceleration, right-left directional acceleration and angular velocity matches the traveling image of the first vehicle 20 on the first traveling route as a general road.

For example, the control unit 13 may generate the information about the virtual front-rear directional acceleration, right-left directional acceleration and angular velocity that the user physically experiences in the driving simulator 50, such that the information about the virtual front-rear directional acceleration, right-left directional acceleration and angular velocity matches the traveling image of the first vehicle 20 on the first traveling route in a circuit field.

Figure 6:
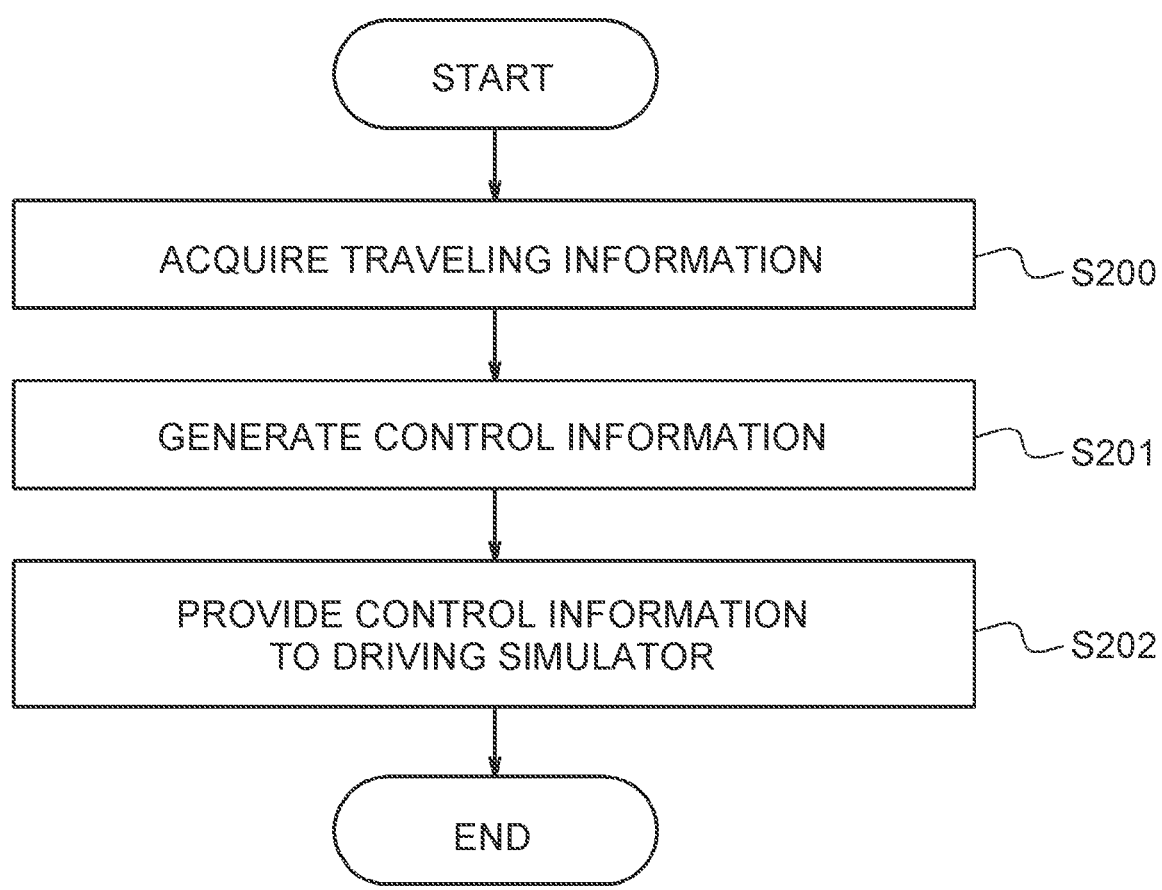
FIG. 6 is a flowchart for describing an exemplary information processing method that is executed by the information processing device in FIG. 5.

Next, an information processing method that is executed by the control unit 13 of the information processing device 10 according to the second embodiment will be described with reference to FIG. 6. FIG. 6 is a flowchart for describing an exemplary information processing method that is executed by the information processing device 10 in FIG. 5. In the exemplary information processing method, a basic flow of the process that is executed by the control unit 13 of the information processing device 10 according to the second embodiment will be described.

In step S200, the control unit 13 acquires the actual traveling information about the first vehicle 20 that travels along the first traveling route.

In step S201, the control unit 13 generates the control information for reproducing the traveling state of the first vehicle 20 on the first traveling route, based on the traveling information about the first vehicle 20 acquired in step S200.

In step S202, the control unit 13 provides the control information generated in step S201, to the driving simulator 50.

The second embodiment described above allows a realistic experience of the traveling state of the predetermined first vehicle 20, in the driving simulator 50. When the control information includes the information for controlling the operation state of the driving simulator 50, the information processing device 10 can reproduce the traveling state of the first vehicle 20 on the first traveling route, in the driving simulator 50 to which the control information is provided. Thereby, even in the driving simulator 50, the user of the driving simulator 50 can virtually obtain a traveling feeling as if the user was traveling along the first traveling route.

Third Embodiment

Figure 7:
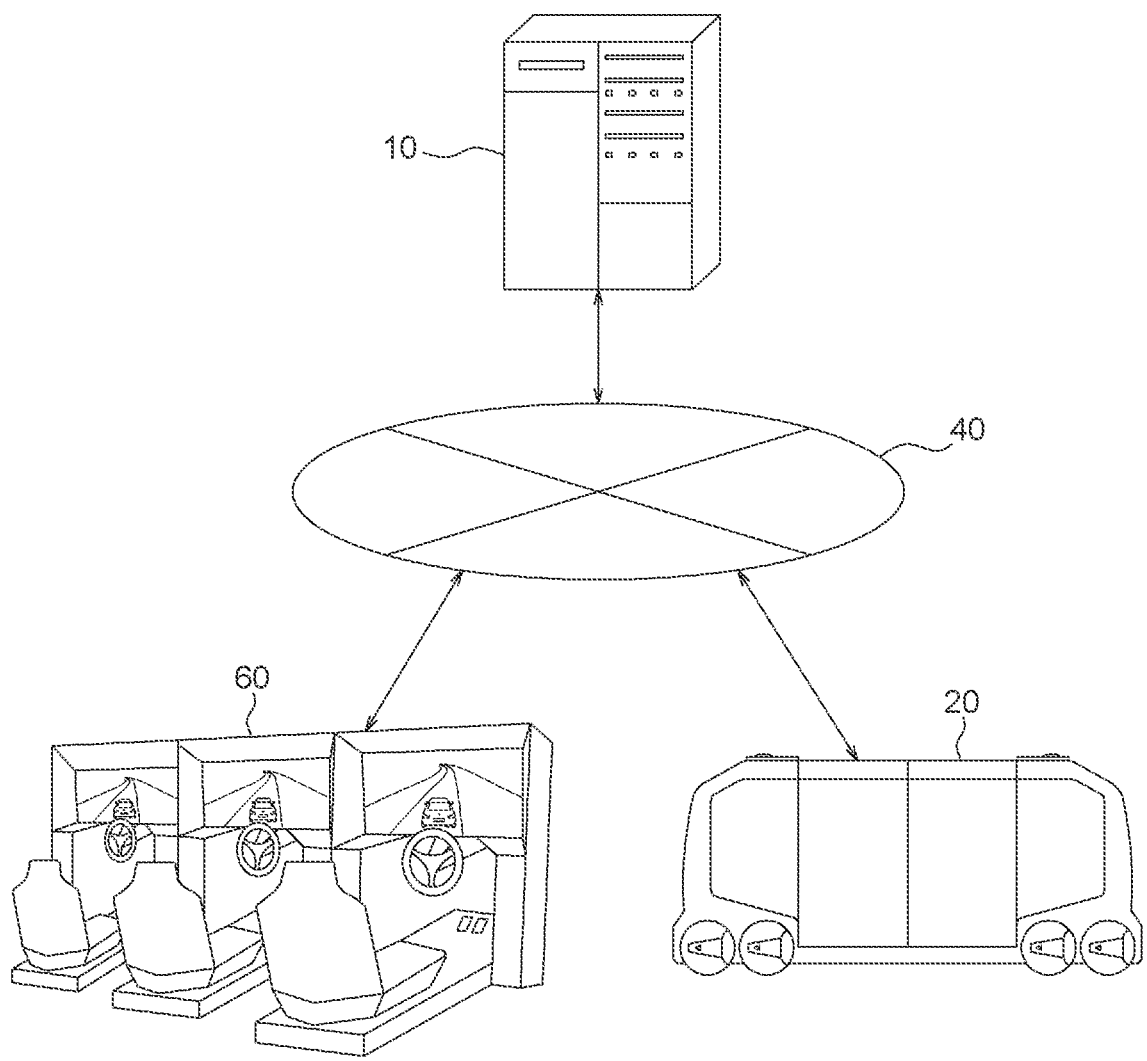
FIG. 7 is a configuration diagram illustrating a configuration of an information processing system that includes an information processing device according to a third embodiment of the present disclosure.

FIG. 7 is a configuration diagram illustrating a configuration of an information processing system 1 that includes an information processing device 10 according to a third embodiment of the present disclosure. An outline of the information processing system 1 that includes the information processing device 10 according to the third embodiment of the present disclosure will be mainly described with reference to FIG. 7.

The information processing system 1 according to the third embodiment is different from the information processing system 1 according to the first embodiment, in that a game machine 60 is included instead of the second vehicle 30. Other configurations, functions, effects, modifications and the like are the same as those in the first embodiment, and the corresponding descriptions can be applied to the information processing system 1 according to the third embodiment. In the following, the same constituent units as those in the first embodiment will be denoted by the same reference numerals, and descriptions of the constituent units will be omitted. Differences from the first embodiment will be mainly described.

In FIG. 7, for simplification of description, one information processing device 10, one first vehicle 20 and one game machine 60 are illustrated. However, in the information processing system 1, each of the number of information processing devices 10, the number of first vehicles 20 and the number of game machine 60 may be two or more. Each of the information processing device 10, the first vehicle 20 and the game machine 60 is communicably connected to the network 40.

For example, the game machine 60 is an arbitrary game machine such as a game machine installed in a game arcade, a stationary game machine for home use and a portable game machine for home use. For example, the game machine 60 is used in order for a user to play a game relevant to driving of a vehicle.

In the third embodiment, for example, the "control information" includes information for controlling the operation state of the game machine 60. For example, the "control information" includes operation information about a virtual velocity, front-rear directional acceleration, right-left directional acceleration, angular velocity, shift lever operation, steering operation and others that the user physically experiences in the game machine 60. For example, the "control information" includes information about a vibration pattern that is given to a seat in the game machine 60.

The control unit 13 of the information processing device 10 provides the generated control information to the game machine 60. For example, the control unit 13 sends the generated control information to the game machine 60 through the communication unit 11 and the network 40.

For example, the control information A in FIG. 3 includes the information about the vibration pattern that is given to the seat in the game machine 60, as the information for controlling the operation state of the game machine 60. The game machine 60 gives vibration to the seat in the game machine 60, based on the control information A acquired from the information processing device 10. Thereby, during operation, the game machine 60 reproduces a traveling state of traveling on a rough road surface in the first traveling route.

For example, the control information B in FIG. 3 includes information about the virtual velocity, front-rear directional acceleration, right-left directional acceleration and angular velocity that the user physically experiences in the game machine 60, as the information for controlling the operation state of the game machine 60. The game machine 60 controls the virtual velocity, front-rear directional acceleration, right-left directional acceleration and angular velocity, based on the control information B acquired from the information processing device 10. Thereby, during operation, the game machine 60 reproduces a traveling state of traveling on a grippy or slippery road surface in the first traveling route.

For example, the control information C in FIG. 3 includes information about the virtual front-rear directional acceleration and right-left directional acceleration that the user physically experiences in the game machine 60, as the information for controlling the operation state of the game machine 60. The game machine 60 controls the virtual front-rear directional acceleration and right-left directional acceleration, based on the control information C acquired from the information processing device 10. Thereby, during operation, the game machine 60 reproduces the acceleration of the first vehicle C3 on the first traveling route.

For example, the control information D in FIG. 3 includes information about the virtual angular velocity that the user physically experiences in the game machine 60, as the information for controlling the operation state of the game machine 60. The game machine 60 controls the virtual angular velocity, based on the control information D acquired from the information processing device 10. Thereby, during operation, the game machine 60 reproduces the angular velocity of the first vehicle C4 on the first traveling route.

For example, the control unit 13 may generate image information that is shown on a monitor of the game machine 60, based on the acquired traveling image of the first vehicle 20. The control unit 13 may generate the control information in association with the generated image information. For example, the control unit 13 may generate the control information that matches the traveling image that is the traveling image of the first vehicle 20 on the first traveling route and that is shown on the monitor of the game machine 60.

For example, the control unit 13 may generate the information about the vibration pattern that is given to the seat in the game machine 60, such that the information about the vibration pattern matches the traveling image of the first vehicle 20 on the first traveling route as a general road. For example, the control unit 13 may generate the information about the virtual velocity, front-rear directional acceleration, right-left directional acceleration and angular velocity that the user physically experiences in the game machine 60, such that the information about the virtual velocity, front-rear directional acceleration, right-left directional acceleration and angular velocity matches the traveling image of the first vehicle 20 on the first traveling route as a general road.

For example, the control unit 13 may generate the information about the virtual front-rear directional acceleration, right-left directional acceleration and angular velocity that the user physically experiences in the game machine 60, such that the information about the virtual front-rear directional acceleration, right-left directional acceleration and angular velocity matches the traveling image of the first vehicle 20 on the first traveling route in a circuit field.

Figure 8:
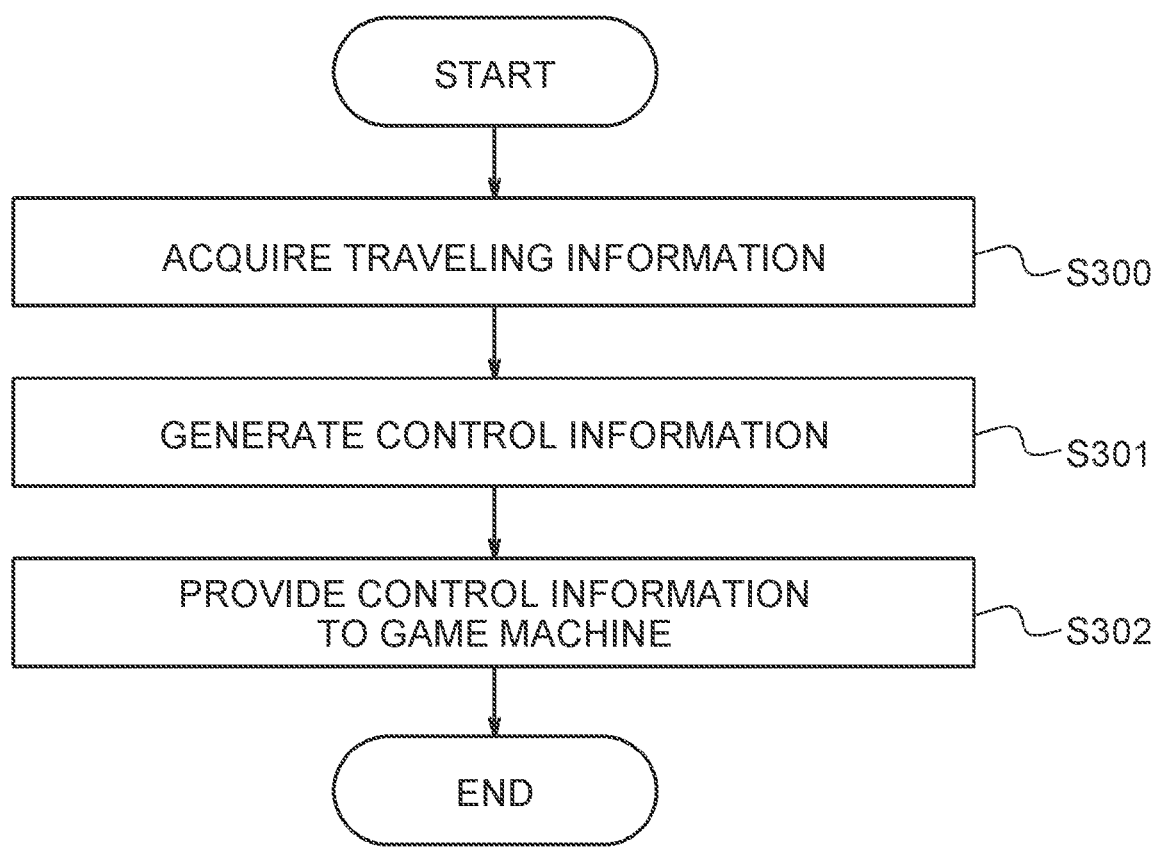
FIG. 8 is a flowchart for describing an exemplary information processing method that is executed by the information processing device in FIG. 7.

Next, an information processing method that is executed by the control unit 13 of the information processing device 10 according to the third embodiment will be described with reference to FIG. 8. FIG. 8 is a flowchart for describing an exemplary information processing method that is executed by the information processing device 10 in FIG. 7. In the exemplary information processing method, a basic flow of the process that is executed by the control unit 13 of the information processing device 10 according to the third embodiment will be described.

In step S300, the control unit 13 acquires the actual traveling information about the first vehicle 20 that travels along the first traveling route.

In step S301, the control unit 13 generates the control information for reproducing the traveling state of the first vehicle 20 on the first traveling route, based on the traveling information about the first vehicle 20 acquired in step S300.

In step S302, the control unit 13 provides the control information generated in step S301, to the game machine 60.

The third embodiment described above allows a realistic experience of the traveling state of the predetermined first vehicle 20, in the game machine 60. When the control information includes the information for controlling the operation state of the game machine 60, the information processing device 10 can reproduce the traveling state of the first vehicle 20 on the first traveling route, in the game machine 60 to which the control information is provided. Thereby, even in the game machine 60, the user of the game machine 60 can virtually obtain a traveling feeling as if the user was traveling along the first traveling route.

The present disclosure has been described based on the drawings and the embodiments. Note that those skilled in the art can make various modifications and alterations based on the present disclosure. Accordingly, it should be noted that the modifications and the alterations are included in the scope of the present disclosure. For example, functions and others included in the constituents, the steps or others can be rearranged as long as there is no logical inconsistency, and a plurality of constituents, steps or others can be combined into one, or can be divided.

For example, in the above embodiments, at least some of the processing operations that are executed in the information processing device 10 may be executed in the first vehicle 20. For example, in the above embodiments, at least some of the processing operations that are executed in the first vehicle 20 may be executed in the information processing device 10.

For example, in the aforementioned first embodiment, at least some of the processing operations that are executed in the information processing device 10 may be executed in the second vehicle 30. For example, in the first embodiment, at least some of the processing operations that are executed in the second vehicle 30 may be executed in the information processing device 10.

For example, in the first embodiment, instead of the information processing device 10, the second vehicle 30 may execute the above processing operations relevant to the information processing device 10.

For example, in the second embodiment, at least some of the processing operations that are executed in the information processing device 10 may be executed in the driving simulator 50. For example, in the second embodiment, at least some of the processing operations that are executed in the driving simulator 50 may be executed in the information processing device 10.

For example, in the third embodiment, at least some of the processing operations that are executed in the information processing device 10 may be executed in the game machine 60. For example, in the third embodiment, at least some of the processing operations that are executed in the game machine 60 may be executed in the information processing device 10.

For example, a general-purpose electronic device such as a smartphone or a computer may function as the information processing device 10 according to the above embodiments. Specifically, a program having processing contents that realize the functions of the information processing device 10 and the like according to the embodiments is stored in a memory of the electronic device, and the program is read and executed by a processor of the electronic device. Accordingly, an embodiment of the present disclosure can be realized as a program that can be executed by a processor. Alternatively, an embodiment of the present disclosure can be realized as a non-transitory computer-readable medium storing a program that can be executed by one or more processors in order to execute the functions of the information processing device 10 and the like according to the embodiments. It should be understood that the scope of the present disclosure includes the program and the non-transitory computer-readable medium.

For example, the information processing device 10 described in the first embodiment may be mounted on the first vehicle 20 or the second vehicle 30. At this time, the information processing device 10 may perform information communication directly with the first vehicle 20 or the second vehicle 30, without using the network 40.

For example, the information processing device 10 described in the second embodiment may be mounted on the first vehicle 20 or the driving simulator 50. At this time, the information processing device 10 may perform information communication directly with the first vehicle 20 or the driving simulator 50, without using the network 40.

For example, the information processing device 10 described in the third embodiment may be mounted on the first vehicle 20 or the game machine 60. At this time, the information processing device 10 may perform information communication directly with the first vehicle 20 or the game machine 60, without using the network 40.

In the first embodiment, the first vehicle 20 and the second vehicle 30 may be vehicles different from each other, or may be the same vehicle. It has been described that the second vehicle 30 that travels along the second traveling route includes at least one of the general vehicle that travels along a traveling route on a general route and a driving-school vehicle that travels along a traveling route in a driving school, but the present disclosure is not limited to this. The second vehicle 30 may include an arbitrary vehicle that travels along an arbitrary traveling route.

It has been described that the information processing device 10 provides the generated control information to the second vehicle 30, the driving simulator 50 or the game machine 60 in the above embodiments, but the present disclosure is not limited to this. The information processing device 10 may provide the control information to another arbitrary medium.

It has been described that the information processing system 1 includes the second vehicle 30, the driving simulator 50 or the game machine 60 in addition to the information processing device 10 and the first vehicle 20 in the above embodiments, but the present disclosure is not limited to this. The information processing system 1 may include only the information processing device 10 and the first vehicle 20.

Alternatively, by combining the first embodiment, the second embodiment and the third embodiment, the information processing system 1 may include all of the second vehicle 30, the driving simulator 50 and the game machine 60, in addition to the information processing device 10 and the first vehicle 20.

What is claimed is:

1. An information processing device comprising a control unit configured to acquire actual traveling information about a first vehicle that travels along a first traveling route, and to generate control information based on the acquired traveling information about the first vehicle, the control information being information for reproducing a traveling state of the first vehicle on the first traveling route and a driving state of the first vehicle that includes information on a vibration pattern.

2. The information processing device according to claim 1, wherein:
   the control information includes information for controlling a traveling state of a second vehicle that travels along a second traveling route different from the first traveling route; and
   the control unit provides the control information to the second vehicle.

3. The information processing device according to claim 2, wherein the control unit generates the control information in association with road surface information about the second traveling route.

4. The information processing device according to claim 2, wherein:
   the traveling information includes a traveling image that is obtained by picking up an exterior of the first vehicle; and
   the control unit generates image information based on the traveling image, and generates the control information in association with the generated image information, the image information being shown on a windshield of the second vehicle while being superimposed on an actual landscape on the second traveling route.

5. The information processing device according to claim 2, wherein the second vehicle that travels along the second traveling route includes at least one of a general vehicle that travels along a traveling route on a general road and a driving-school vehicle that travels along a traveling route in a driving school.

6. The information processing device according to claim 1, wherein:
   the control information includes information for controlling an operation state of a driving simulator; and
   the control unit provides the control information to the driving simulator.

7. The information processing device according to claim 1, wherein:
   the control unit generates control information that reproduces the vibration pattern of the first vehicle on a second route traveled by a second vehicle from the driving conditions including information on a rough road surface of the first route traveled by the first vehicle.

8. An information processing system comprising:
   the information processing device according to claim 1; and
   the first vehicle that provides the traveling information to the information processing device.

9. A program that causes an information processing device to execute an operation including:
   acquiring actual traveling information about a first vehicle that travels along a first traveling route; and
   generating control information based on the acquired traveling information about the first vehicle, the control information being information for reproducing a traveling state of the first vehicle on the first traveling route and a driving state of the first vehicle that includes information on a vibration pattern.

10. The program according to claim 9, wherein:
    the control information includes information for controlling a traveling state of a second vehicle that travels along a second traveling route different from the first traveling route; and
    the operation includes providing the control information to the second vehicle.

11. The program according to claim 10, wherein the operation includes generating the control information in association with road surface information about the second traveling route.

12. The program according to claim 10, wherein:
    the traveling information includes a traveling image that is obtained by picking up an exterior of the first vehicle; and
    the operation includes generating image information based on the traveling image, and generating the control information in association with the generated image information, the image information being shown on a windshield of the second vehicle while being superimposed on an actual landscape on the second traveling route.

13. The program according to claim 9, wherein:
    the control information includes information for controlling an operation state of a driving simulator; and
    the operation includes providing the control information to the driving simulator.

14. The program according to claim 9, wherein:
    the control information includes information for controlling an operation state of a game machine; and
    the operation includes providing the control information to the game machine.

15. A vehicle comprising a control unit configured to acquire actual traveling information about another vehicle that travels along a first traveling route, and to generate control information based on the acquired traveling information about the other vehicle, the control information being information for reproducing a traveling state of the other vehicle on the first traveling route and a driving state of the first vehicle that includes information on a vibration pattern.

16. The vehicle according to claim 15, wherein the control information includes information for controlling a traveling state of the vehicle that travels along a second traveling route different from the first traveling route.

17. The vehicle according to claim 16, wherein the control unit generates the control information in association with road surface information about the second traveling route.

18. The vehicle according to claim 16, wherein the control unit acquires information about a moving image that is provided to an occupant in a vehicle cabin of the vehicle, and generates the control information in association with the acquired information about the moving image.

19. The vehicle according to claim 16, wherein:
the traveling information includes a traveling image that is obtained by picking up an exterior of the other vehicle; and
the control unit generates image information based on the traveling image, and generates the control information in association with the generated image information, the image information being shown on a windshield of the vehicle while being superimposed on an actual landscape on the second traveling route.

20. The vehicle according to claim 16, wherein the vehicle that travels along the second traveling route includes at least one of a general vehicle that travels along a traveling route on a general road and a driving-school vehicle that travels along a traveling route in a driving school.

\* \* \* \* \*